United States Patent [19]
Haberle

[11] 3,788,434
[45] Jan. 29, 1974

[54] COUPLING

[76] Inventor: Wilhelm Häberle, Industriegelande, Scheer, Germany

[22] Filed: Aug. 2, 1972

[21] Appl. No.: 277,251

[30] Foreign Application Priority Data
Aug. 7, 1971 Germany.................. P 21 39 637.2

[52] U.S. Cl.................................. 192/26, 192/74
[51] Int. Cl........................ F16d 13/02, F16d 13/14
[58] Field of Search......................... 192/26, 74, 75

[56] References Cited
UNITED STATES PATENTS
1,032,759  7/1912  Maurer................................. 192/26
2,153,007  4/1939  Rosenmund......................... 192/26
2,969,861  1/1961  Wright................................. 192/26

FOREIGN PATENTS OR APPLICATIONS
552,923  1/1923  France................................. 192/26

*Primary Examiner*—Allan D. Herrmann
*Attorney, Agent, or Firm*—Ernest F. Marmorek

[57]  ABSTRACT

A coupling arrangement for coupling a driven shaft with a driving shaft in at least one coupling position in a releasable fashion having a crank fixedly coupled with the driven shaft, an excenter lever rotatably journaling a brake shoe and a hollow shaft cooperating with the brake shoe, a spring device operating on the excenter lever for effecting closing of the coupling arrangement and, a stopping arrangement associated with the excenter lines.

9 Claims, 4 Drawing Figures

COUPLING

FIELD OF THE INVENTION

The present invention relates to a switchable coupling means by means of which a driving shaft or a similar constructional member can be coupled in a single or several coupling positions with a driven shaft or similar member and, thereby constituting a releasable drive therebetween.

BACKGROUND OF THE INVENTION

The above described coupling arrangement is generally known in connection with deep drawing machines and, particularly for the drive of the stamping unit thereof which is coupled with a driving shaft over a crank drive. The switchable or releasable coupling in such known driving arrangements consists of a wedge which can be rotated within predetermined limits and which is placed in a recess on the shaft and which can be locked in a single or several recesses formed on the shaft or on a structural element journalled on the shaft, automatically or by means of a spring. In such known arrangements the wedge has associated herewith a boss or stopping arrangement which cooperates with the wedge over a lever.

The above described known device has been especially used for the controlling of the advancing of the stamping unit and for the controlling of the cooling. It has been, however, found that during operation the locking or shoving in of the wedge is accompanied by substantial noise which is very disturbing. In addition a fixed coupling is possible only in one sense of the direction and in the event the apparatus is rotated at high speed, its use becomes nearly completely prohibited or extremely limited. In addition, there is considerable wear of the coupling unit present. Furthermore, in the known coupling device frequently there is a brake required which has to exert a braking effect before the wedge can be placed into coupling position.

SUMMARY OF THE INVENTION

It is, therefore, an object of the present invention to provide a new coupling apparatus of the above type which eliminates the above noted shortcomings of the known coupling apparatus and, at the same time, provides a reliable and substantially noise-free coupling and a translation of the rotational momentum in both directions at high operating speeds, or a reliable releasing of the coupling also at favorable operating conditions.

It is another object of the present invention to provide a novel coupling arrangement of the last mentioned type which is simple in its construction and, therefore, is inexpensive to make. The novel coupling arrangement of the present invention is also self-locking, that is, it enters into the coupling position automatically and remains coupled without the provision of additional aiding means or additional braking arrangement.

According to the present invention the above objects are attained that the releasable and switchable coupling arrangement according to the present invention comprises a crank or piston rod which is fixedly coupled with the driven shaft, a brake shoe rotatably journaled by means of an excenter lever and a hollow shaft coupled with the driven shaft and cooperating with the brake shoe, a plurality of spring means effecting the opening of the coupling in cooperation with a boss or stopping arrangement adjustable in its effect. The excenter lever according to the present invention is rotatably journaled in the crank shaft and the brake shoe is arranged on a pin or lug excentrically arranged with respect to the crank journalling position, the brake shoe being provided preferably with a brake insert, whereby the excenter lever in the case the coupling is closed, is abutting with one end thereof on inserts made from a synthetic material and being forced into such abutting position by means of the force of a spring means.

The boss or stopping arrangement cooperating with the excenter lever in the opening of the coupling arrangement according to the present invention can be preferably made in the form of a cylinder into which a piston is set and which is operated by means of a pressurized medium, the piston rod having an abutting surface on which the excenter lever when the coupling is being opened abuts with its other end which has preferably a plastic insert provided therein to reduce the noise.

In another embodiment of the boss or stopping arrangement according to the present invention it is preferred that the stopping or abutting surface provided on the piston rod is made in the form of a slant surface inclined with respect to the axial direction of the piston rod and is cooperating with the counter surface on the excenter lever and, at the same time, making the boss or stopping arrangement adjustable about the circumference by providing such adjusting possibility in the form of longitudinal slots for mounting.

The invention also provides the possibility that the crank shaft is coupled with the driven shaft by means of elastic spacing members, such as rubber studs and, that the driven hollow shaft cooperating with the brake shoe is made in the form of a fly wheel.

In order to prevent a return movement from side position the invention provides that the driven shaft is provided with a one way coupling arrangement which is set following the setting of the switchable coupling arrangement according to the present invention.

BRIEF DESCRIPTION OF THE DRAWING

The invention will become more readily apparent from the following description of a preferred embodiment thereof shown, by way of example, in the accompanying drawings, in which:

FIG. 4 is a different embodiment of the boss of FIG. 2.

DESCRIPTION OF THE PREFERRED EMBODIMENT

Figure 1:
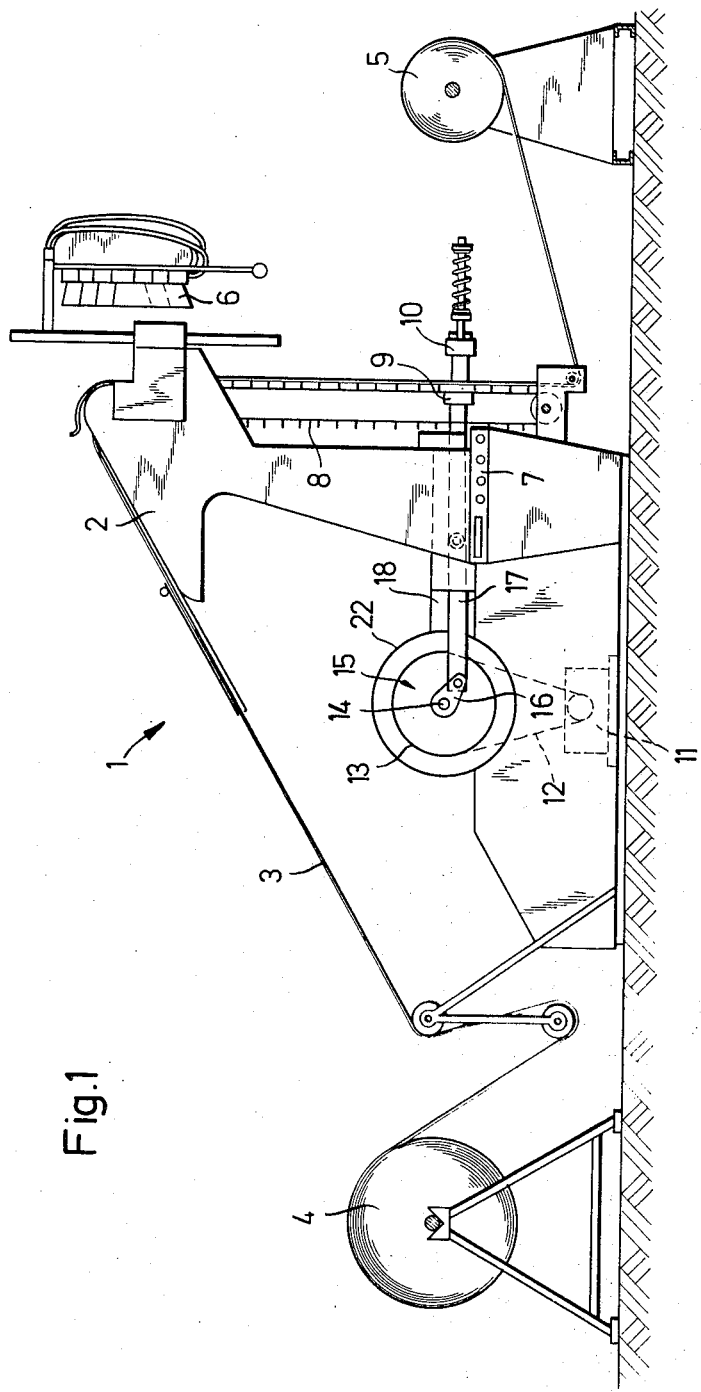
FIG. 1 is a schematic illustration of a deep drawing machine.

With reference to FIG. 1 illustrating a machine 1 for the production of hollow body from a thermo plastic pliable synthetic material which is in the form of foil, comprises a stand 2 in which in a machine space 18 a plasticizing or deforming unit 9 and a stamping unit 10 are placed. The synthetic or plastic foil 3 is taken off in steps from a supply roller 4 by means of a supply chain 8 and is delivered in steps between the plasticizing or deforming unit 9 and the press 10 after the forms having been stamped out in the shape which is necessary for the production of the hollow body, the remaining strip is taken up on a further roller 5. For heating up a foil 3 before the forming process several heating members 6 are provided which are mounted on the machine stand 2 and which are placed at a variable distance with respect to the foil 3 and to the deforming unit 9. In addition, the stand 2 is provided with a control panel 7 on which the individual indicating device as well as control devices are mounted to serve for the setting of the various processing times, etc.

The arrangement for driving the stamping unit 10 comprises a driving machine 11 from which the driving energy is supplied by means of a wedge belt 12 to a wedge belt disc 13 which, in turn, by means of a switchable coupling 15, according to the present invention is coupled with a shaft 14 in a positive or frictional-type manner. On the shaft 14 there is provided a crank 16 so that with the help of a crank shaft 17, which is secured to the stamping unit 10, the rotational movement of the shaft 14 is translated into an axial movement necessary for the deep drawing process.

Figure 2:
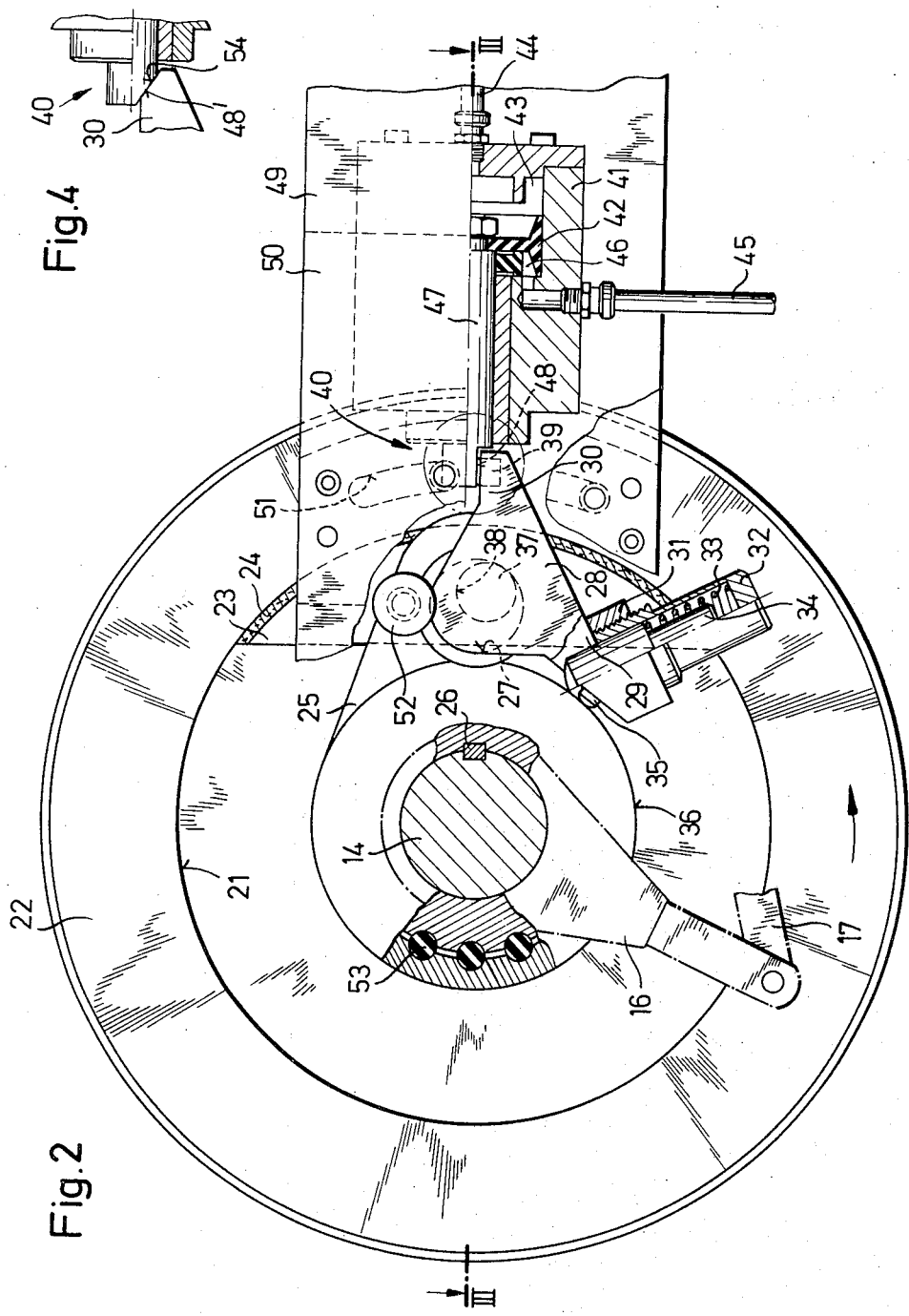
FIG. 2 is a sectional view of the switching coupling according to the present invention, on an enlarged scale, taken along the line II—II FIG. 3.
Figure 3:
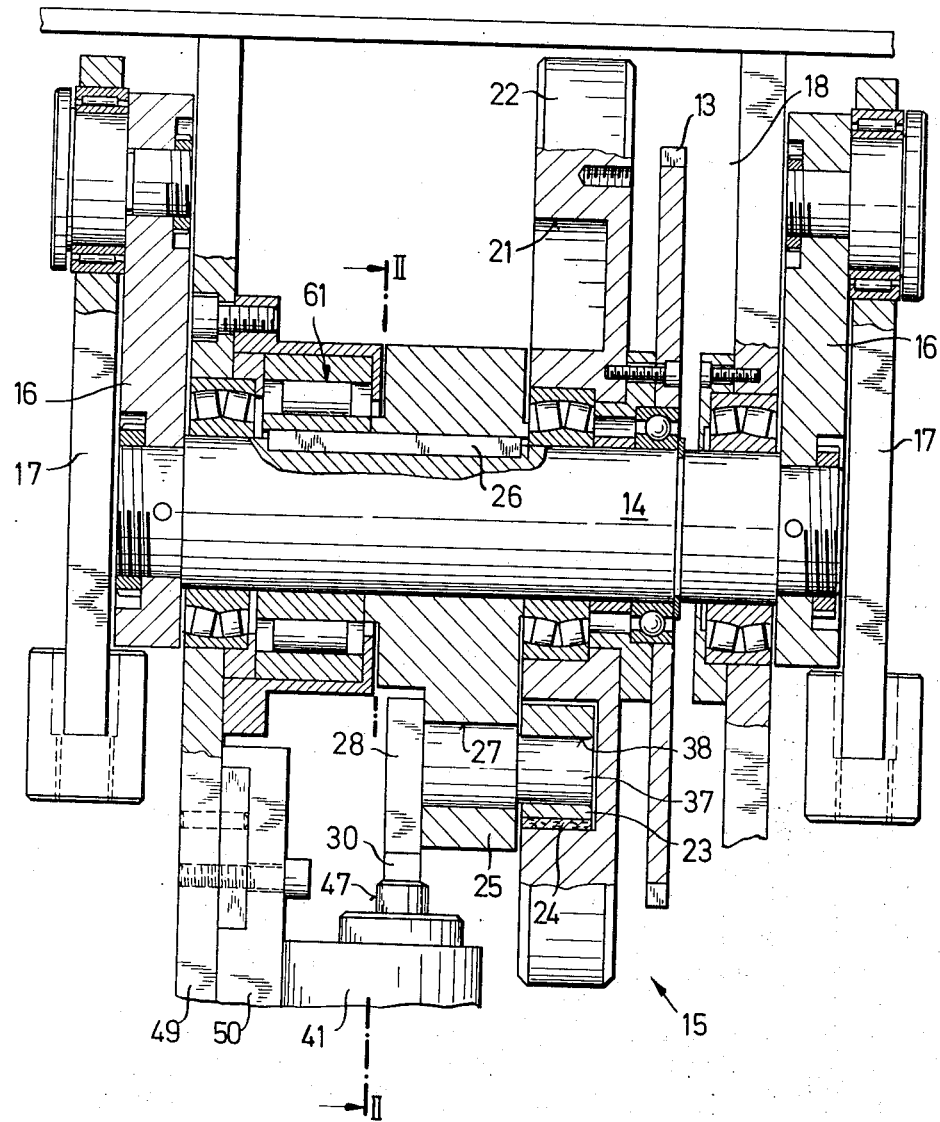
FIG. 3 is the driving arrangement according to the present invention, in section, taken along line III—III in FIG. 2.

The switchable coupling 15 for connecting the shaft 14 with the driven wedge belt disc 13 comprises, as can be seen in FIGS. 2 and 3, a hollow shaft 21 which is made in the shape of a fly wheel 22 coupled with the wedge belt disc 13, and a brake shoe 23 carrying a brake insert 24 is journaled on an excenter lever 28 which in turn is inserted into a recess 27 and adapted to be rotated by means of a crank rod 25 which is fixedly connected with the shaft 14 by means of a wedge 26. For the journalling of the brake shoe 23 there is provided a crank web 37 arranged excentrically with respect to the journalling position of the crank or piston rod 25 and which engages the brake shoe 23 by means of a bore 38.

One end 29 of the excenter lever 28 is forced away from the crank rod 25 by means of a spring 33 supported in sleeves 31 and 32 and which is abutting on the surface 36 of the crank 25 by means of a pressure piece 34. As a result of the force of the spring 33 the coupling 15 remains closed until the other end 30 thereof can come in abutting relationship with a boss 40. In the ends 29 and 30 of the lever 28 there are provided inserts 35 and 39 from a plastic or similar material for damping purposes and, the crank 25 or the boss 40 comes to abut on them so that a hard setting up or abutting is prevented and a substantially noise free abutting is attained.

The boss or stop 40 is formed by means of a piston 42 which is placed into a cylinder 41 in a slidable fashion and having a piston rod 47 provided with appropriate abutting surface 48. By supplying a pressurized medium over the conduit 44 into the pressure chamber 43, the piston 42 can be brought into the position illustrated so that the excenter lever 28 comes into abutment onto the abutting surface provided on the piston rod 47 thereof. On the other hand, when the pressurized medium is supplied over the conduit 54 into the pressure chamber 43 then the piston 42 is brought into the right end position and thereby the abutting onto the boss 40 is released. Inasmuch as cylinder 41 is placed on a plate 50 and its securing on a further plate 49 of the machine stand 2 is performed by means of longitudinal slots 51 concentrically arranged about the axis of the shaft 14, it becomes possible that the position of the boss or stop 40 be changed and, thereby the opening of the coupling 15 can be controlled in a simple fashion.

The boss or stop arrangement 40 can according to FIG. 4 be made as a slant surface 48' formed on the piston rod 47 and which cooperates with a counter surface 54 of the excenter lever 28. In this manner it becomes possible that the brake insert 24 can be reliably released since the slanted surfaces 48' and 54 produces an axially directed force which will press away the piston 42 and, thereby, there is a larger path available for the opening of the coupling 15.

In order that the excenter lever 28 could be axially secured, there is provided a holding screw 52 screwed into the crank 25. In addition, as can be seen partially in FIG.2 the crank 25 can be made to consist of two parts and both parts could be connected by means of an elastic intermediate connecting means 53. It is also provided that in order to prevent a back rotation, the shaft 14 is provided with a free running, one way means 61.

If the boss or stop arrangement 40 becomes released by moving the piston 42 to the right, then the coupling 15 becomes automatically closed. By means of the spring 33 the excenter lever 28 becomes pressed away from the crank 25 and rotated in a counterclock-wise direction. During this the brake shoe 23 since it is mounted excentrically with respect to the journalling position of the excenter lever 28 in a bore 27, becomes shifted to the right and the coupling 15 becomes closed. By variably selecting the magnitude of the excentricity, one may thereby influence the closing force of the coupling 15 and, under certain conditions, if the length of the lever 28 is also variable, one may produce a very large force.

If the drive of the shaft 14 is desired to be disconnected than one has to only supply the presurized medium into the pressure chamber 43. As a result, the piston 42 is displaced to the left and, thereby, the boss or stop arrangement 40 is brought into the path of movement of the excenter lever 28, then the lever 28 will come into abutment with one of its ends 30 onto the stop arrangement 40. The excenter lever 28 becomes rotated against the force of the spring 33 and the brake shoe 23 becomes disengaged from the hollow shaft 21 so that the positive force coupling between shaft 21 and shaft 14 is released and, as a result, the stamping unit 10 coupled to the crank 16 goes into, for example, a rest state required for the cooling off of the formed object. The exact position of the stamping unit 10 can, as a result, easily be determined inasmuch as the boss or stopping arrangement 40 can be adjusted about the peripheral direction.

A switchable coupling arrangement according to the present invention which is used for preferably driving the stamping unit 10 of a deep drawing machine 1 excells itself not only by its simple construction but also by its low cost of manufacturing and, at the same time, by its reliability in operation and its coupling performance without any noise. The coupling arrangements 15 according to the present invention as has been shown above, is made only from the combination of a braking shoe 23 rotatably journaled by means of an excenter lever 28 and a hollow shaft 22 cooperating therewith and, in which for the opening of the coupling arrangement 15 is provided a stop or boss arrangement 40, each requiring only very small number of components. During operation wear can be observed only on the friction insert 24 which contributes to the damping of the coupling arrangement during coupling, which is however, exchangable so that there will be always a reliable and noise free functioning of the coupling present without requiring a major servicing or replacement operation.

In addition when the switchable coupling arrangement according to the present invention is used in connection with the driving parts of a deep drawing machine, such as a press or a similar machine, it assures a good control of the advance of the stamping unit and a high operating efficiency thereof. As it is well known, the forward and return runs of a stamping unit of a pressing die are performed at a high constant revolution of the driven shaft and its hold positions can be adjusted by means of the boss arrangement very easily so that the necessary cooling and resting periods are well regulated according to the present invention. At the same time, the productivity of the forming machine is assured which in turn reduces the production costs of the overall machine. The coupling arrangement according to the present invention turned out to be an excellent and very advantageous aid in the driving arrangements of machines of the above described type, especially deep drawing machines.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A coupling arrangement for releasably coupling a driven means with a driving means in at least one position, said coupling arrangement comprising a crank rod means fixedly coupled to the driven means, a brake shoe means, an excenter lever means rotatably mounted on said crank rod means and journaled on said brake shoe means, a hollow shaft means coupled to said driving means and cooperating with said brake shoe means, spring means operating on the excenter lever means for effecting closing of said coupling arrangement and, a stopping arrangement associated with said excenter lever means.

2. A coupling arrangement for coupling a driven means with a driving means in at least one coupling position in a releasable fashion comprising a crank means fixedly coupled with the driven means, a brake shoe means, comprising a brake shoe insert, an excenter lever means rotatably journaling said brake shoe means, said excenter lever means comprising a lug means carrying said brake shoe means, said lug means being arranged excentrically with respect to the mounting position of said crank means, said brake shoe means comprising a brake shoe insert, a hollow shaft means cooperating with said brake shoe means, spring means operating on the excenter lever means for effecting opening of said coupling arrangement and, a stopping arrangement associated with said spring means.

3. The coupling arrangement as claimed in claim 2, wherein said excenter lever means comprises portions made from a synthetic material for damping purposes, said portion comprising the end portion of said excenter lever means, said end portion abutting against said crank means when said coupling arrangement is closed.

4. The coupling arrangement as claimed in claim 2, wherein said stopping arrangement cooperating with said excenter lever means in the opening of said coupling arrangement comprises a cylinder, a piston means slidably arranged therein and operable with a pressurized medium, said piston means comprising a piston rod having an abutting surface provided thereon, said excenter lever means with the other end portion thereof at the opening of said coupling arrangement abutting against said abutting surface of said piston rod means.

5. The coupling arrangement as claimed in claim 4, wherein said abutting surface provided on said piston rod means is inclined with respect to the axial direction of said piston rod means and said excenter lever means comprising a counter surface cooperating with said inclined surface of said abutting surface of said piston rod means.

6. The coupling arrangement as claimed in claim 4, wherein said coupling arrangement is mounted adjustably about the circumference of said crank means, and means provided for adjustably mounting said stopping arrangement.

7. The coupling arrangement as claimed in claim 6, wherein said crank means comprising rubber stud means for coupling said crank means with said driven means.

8. The coupling arrangement as claimed in claim 7, wherein said driven hollow shaft means cooperating with the brake shoe means is a flywheel means.

9. The coupling arrangement as claimed in claim 8, wherein a one-way coupling means, mounted on the driven means is provided for additional coupling after said coupling arrangement is set.

* * * * *